(12) United States Patent
Yoon et al.

(10) Patent No.: US 12,308,482 B2
(45) Date of Patent: May 20, 2025

(54) BATTERY MODULE COMPRISING BUSBAR PLATE, BATTERY PACK COMPRISING BATTERY MODULE, AND ELECTRONIC DEVICE

(71) Applicant: LG Energy Solution, Ltd., Seoul (KR)

(72) Inventors: Hyoung-Chul Yoon, Daejeon (KR); Suk-Hoon Lee, Daejeon (KR); Young-Su Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 495 days.

(21) Appl. No.: 17/762,237

(22) PCT Filed: Sep. 10, 2020

(86) PCT No.: PCT/KR2020/012263
§ 371 (c)(1),
(2) Date: Mar. 21, 2022

(87) PCT Pub. No.: WO2021/071113
PCT Pub. Date: Apr. 15, 2021

(65) Prior Publication Data
US 2022/0344778 A1 Oct. 27, 2022

(30) Foreign Application Priority Data

Oct. 11, 2019 (KR) .................. 10-2019-0126474
Sep. 3, 2020 (KR) .................. 10-2020-0112663

(51) Int. Cl.
*H01M 50/559* (2021.01)
*H01M 50/213* (2021.01)
(Continued)

(52) U.S. Cl.
CPC ....... *H01M 50/595* (2021.01); *H01M 50/213* (2021.01); *H01M 50/30* (2021.01);
(Continued)

(58) Field of Classification Search
None
See application file for complete search history.

(56) References Cited

U.S. PATENT DOCUMENTS

2013/0284483 A1 10/2013 Modock
2014/0315055 A1* 10/2014 Byun .................. H01M 50/583
429/61

(Continued)

FOREIGN PATENT DOCUMENTS

CN 110088938 A 8/2019
EP 3419083 A1 12/2018
(Continued)

OTHER PUBLICATIONS

International Search Report and Written Opinion (with partial English translation) issued in corresponding International Patent Application No. PCT/KR2020/012263 dated Dec. 15, 2020.
(Continued)

*Primary Examiner* — Jonathan Crepeau
(74) *Attorney, Agent, or Firm* — Morgan, Lewis & Bockius LLP

(57) ABSTRACT

A battery module includes: a plurality of cylindrical battery cells including a gas vent portion to discharge an internal gas; and a busbar plate including a plurality of connection terminals that protrude and extend from an inner edge of a connection opening, and to electrically connect the cylindrical battery cells by contacting a positive or negative electrode terminal, and have different shapes depending on the contacted positive or negative electrode terminal, and a connection terminal contacting a positive or negative electrode terminal not having the gas vent portion. The connection terminal includes: a fuse portion to be disconnected when a current of a predetermined level or higher flows from the cylindrical battery cells and having a bent structure bent; and a protection tube to contract at a predetermined tem-
(Continued)

perature with electric insulation and to surround at least a portion of an outer surface of the fuse portion.

11 Claims, 10 Drawing Sheets

(51) Int. Cl.
*H01M 50/30* (2021.01)
*H01M 50/502* (2021.01)
*H01M 50/581* (2021.01)
*H01M 50/583* (2021.01)
*H01M 50/595* (2021.01)

(52) U.S. Cl.
CPC ....... *H01M 50/502* (2021.01); *H01M 50/559* (2021.01); *H01M 50/581* (2021.01); *H01M 50/583* (2021.01)

(56) References Cited

U.S. PATENT DOCUMENTS

| | | |
|---|---|---|
| 2015/0380713 A1 | 12/2015 | Kimura et al. |
| 2016/0141573 A1 | 5/2016 | Aoki et al. |
| 2017/0214033 A1 | 7/2017 | Takano et al. |
| 2019/0372069 A1 | 12/2019 | Lee et al. |
| 2020/0076022 A1 | 3/2020 | Kawakami et al. |
| 2020/0227708 A1 | 7/2020 | Ahn et al. |

FOREIGN PATENT DOCUMENTS

| | | | |
|---|---|---|---|
| JP | 2014-146516 | A | 8/2014 |
| JP | 2016-066455 | A | 4/2016 |
| JP | 6006134 | B2 | 10/2016 |
| JP | WO2015/064097 | A1 | 3/2017 |
| JP | 6109926 | B2 | 4/2017 |
| JP | 2017-84603 | A | 5/2017 |
| JP | 2017-084603 | A | 5/2017 |
| JP | 2017-084606 | A | 5/2017 |
| JP | 2017-084637 | A | 5/2017 |
| JP | WO2016/072054 | A1 | 8/2017 |
| JP | 2017-157509 | A | 9/2017 |
| JP | 2018-037364 | A | 3/2018 |
| JP | 2018-037664 | A | 3/2018 |
| JP | 6360092 | B2 | 7/2018 |
| JP | 6414018 | B2 | 10/2018 |
| JP | 2018-198181 | A | 12/2018 |
| JP | 2019-091522 | A | 6/2019 |
| KR | 10-2012-0133203 | A | 12/2012 |
| KR | 10-2019-0096805 | A | 8/2019 |
| WO | 2018/221004 | A1 | 12/2018 |
| WO | 2019/139385 | A1 | 7/2019 |

OTHER PUBLICATIONS

European Search Report issued in corresponding European Patent Application No. 20875110.7 dated Oct. 28, 2022.
Office Action issued in corresponding Japanese Patent Application No. 2021-575428 dated Jan. 4, 2023.
Chinese Office Action issued in corresponding CN Application No. 202080051945.X dated Jun. 3, 2023. Note: EP3419083, WO2018/221004, and JP2018-198181 cited therein are already of record.

* cited by examiner

BATTERY MODULE COMPRISING BUSBAR PLATE, BATTERY PACK COMPRISING BATTERY MODULE, AND ELECTRONIC DEVICE

TECHNICAL FIELD

The present disclosure relates to a battery module including a busbar plate, a battery pack including the same, and an electronic device, and more particularly, to a battery module including a busbar plate for quickly achieving electrical disconnection when an abnormal behavior (short circuit) of a cylindrical battery cell occurs.

The present application claims priority to Korean Patent Application No. 10-2019-0126474 filed on Oct. 11, 2019, and Korean Patent Application No. 10-2020-0112663 filed on Sep. 3, 2020, in the Republic of Korea, the disclosures of which are incorporated herein by reference.

BACKGROUND ART

Recently, with the rapid increase in demands for portable electronic products, such as laptop computers, video cameras, portable phones, and the like, and the regularization of development of electric vehicles, energy storage batteries, robots, satellites, and the like, high-performance secondary batteries capable of being repeatedly charged and discharged have been actively studied.

Currently commercialized secondary batteries include nickel cadmium batteries, nickel hydrogen batteries, nickel zinc batteries, lithium secondary batteries, etc. and the lithium secondary batteries thereamong are receiving attention according advantages of free charging/discharging, a very low self-discharge rate, and high energy density since a memory effect is barely generated compared to nickel-based secondary batteries.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate on which the positive electrode active material and the negative electrode active material are respectively coated are arranged with a separator therebetween, and an exterior material, i.e., a battery case, sealing and accommodating the electrode assembly together with an electrolyte solution.

Generally, the lithium secondary battery may be classified into a can-type secondary battery, in which the electrode assembly is embedded in a metal can, and a pouch-type secondary battery, in which the electrode assembly is embedded in a pouch of an aluminum laminate sheet, according to a shape of the exterior material.

Here, in the can-type secondary battery, the metal can in which the electrode assembly is embedded may be manufactured in a cylindrical shape. Such a can-type secondary battery may be used to configure a battery module including a housing accommodating a plurality of secondary batteries and a busbar configured to electrically connect the plurality of secondary batteries to each other.

Recently, there are cases where the busbar included in such a battery module uses a material having somewhat high electric resistance to increase weldability of resistance welding with an electrode terminal.

However, a product using the battery module may malfunction when an electric short circuit occurs between some secondary batteries from among the plurality of secondary batteries embedded in the battery module and a high current flows through the busbar through the some secondary batteries. In this regard, a current may be blocked by using a battery management system (BMS), but there is no countermeasure against the high current when the BMS does not function or malfunctions, thereby leading to a malfunction or a fire accident.

DISCLOSURE

Technical Problem

The present disclosure is designed to solve the problems above, and therefore the present disclosure is directed to providing a battery module including a busbar plate for quickly achieving electric disconnection when an abnormal behavior (short circuit) of a cylindrical battery cell occurs.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery module according to the present disclosure for achieving the technical problem includes: a plurality of cylindrical battery cells arranged in a horizontal direction, wherein some of the plurality of cylindrical battery cells include positive electrode terminals and negative electrode terminals respectively at upper portions and lower portions and remaining of the plurality of cylindrical battery cells include negative electrode terminals and positive electrode terminals respectively at upper portions and lower portions, and including a gas vent portion configured to discharge an internal gas by opening the positive electrode terminals or the negative electrode terminals when an internal pressure is increased to a predetermined level or higher; and a busbar plate including a main body portion that is located at the upper portions or lower portions of the plurality of cylindrical battery cells, includes a plate shape extending in the horizontal direction to cover the plurality of cylindrical battery cells, and includes at least one connection opening in which a portion facing the positive electrode terminals or negative electrode terminals is perforated in an up-and-down direction, and a positive electrode connection terminal and a negative electrode connection terminal that protrude and extend from an inner edge of the at least one connection opening, are configured to electrically connect the plurality of cylindrical battery cells to each other when the protruded and extended portion contacts the positive electrode terminals or the negative electrode terminals, and have different shapes depending on the contacted positive electrode terminals or negative electrode terminals, wherein a connection terminal that contacts a positive electrode terminal or negative electrode terminal not opened by the gas vent portion, from among the positive electrode connection terminal and the negative electrode connection terminal, includes: a fuse portion configured to be disconnected when a current of predetermined level or higher flows from the plurality of cylindrical battery cells and having a bent structure bent at least one time in the horizontal direction; and a protection tube configured to contract at a predetermined temperature with electric insulation and surround at least a portion of an outer surface of the fuse portion.

The connection terminal may further include a connecting portion directly contacting the positive electrode terminals or negative electrode terminals of the plurality of cylindrical battery cells and having a branched structure branched and extending in two sides, wherein the fuse portion may protrude and extend in the horizontal direction from an inner edge of the connection opening and an end portion in an extending direction may be connected to one end portion of the connecting portion.

The protection tube may have one side connected to the inner edge of the connection opening and another side connected to the fuse portion.

The protection tube may be configured to at least partially thermally contract to pull a portion of the fuse portion when the fuse portion is disconnected.

The protection tube may have a shape separated in at least two pieces.

The protection tube may include a discharge hole configured such that a melted portion of the fuse portion is externally discharged.

The connection terminal may include at least two fuse portions and the at least two fuse portions may be spaced apart from each other by a predetermined interval.

The at least two fuse portions may have different sizes of widths in the horizontal direction.

The fuse portion may have a shape in which a portion is curved in an arch shape, and when the portion of the fuse portion in the arch shape is disconnected, two portions separated by the disconnection may be parted from each other by elasticity.

A fuse portion of a connection terminal contacting a positive electrode terminal or negative electrode terminal of a cylindrical battery cell located relatively inside from among the plurality of cylindrical battery cells arranged in the horizontal direction may have a greater width than a fuse portion of a connection terminal contacting a positive electrode terminal or negative electrode terminal of a cylindrical battery cell located relatively outside.

A battery pack according to the present disclosure for achieving the technical problem includes at least one battery module.

An electronic device according to the present disclosure for achieving the technical problem includes the battery pack.

Advantageous Effects

According to an aspect of the present disclosure, a battery module of the present disclosure has a bent structure in which a fuse portion is bent at least one time in a horizontal direction, and thus it is easy to obtain a longer current path in a same space. In other words, when the fuse portion has a shape extending in a straight line, a larger connection opening needs to be formed, which may be a factor of a space restriction for one busbar plate to form an electric connection with more cylindrical battery cells in a predetermined space. Accordingly, in the present disclosure, it is easy to implement a compact battery module by significantly reducing a space occupied by the fuse portion of the busbar plate.

In addition, the present disclosure applies, to a connection terminal including the fuse portion, a protection tube having electric insulation, contracting at a predetermined temperature, and configured to surround at least a portion of an outer surface of the fuse portion such as to prevent heat from externally dissipating when the fuse portion is melted by a high current. Thus, the fuse portion may rise to a high temperature more quickly and achieve quick disconnection.

Also, according to an aspect of another embodiment of the present disclosure, the protection tube has a structure in which one side is connected to an inner edge of the connection opening and another side is connected to the fuse portion, and thus when the battery module is continuously vibrated by an external force, the vibration of the fuse portion may be reduced by an extended portion of the protection tube. Accordingly, a risk that the fuse portion may be cut or damaged by the continuous vibration may be effectively reduced.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
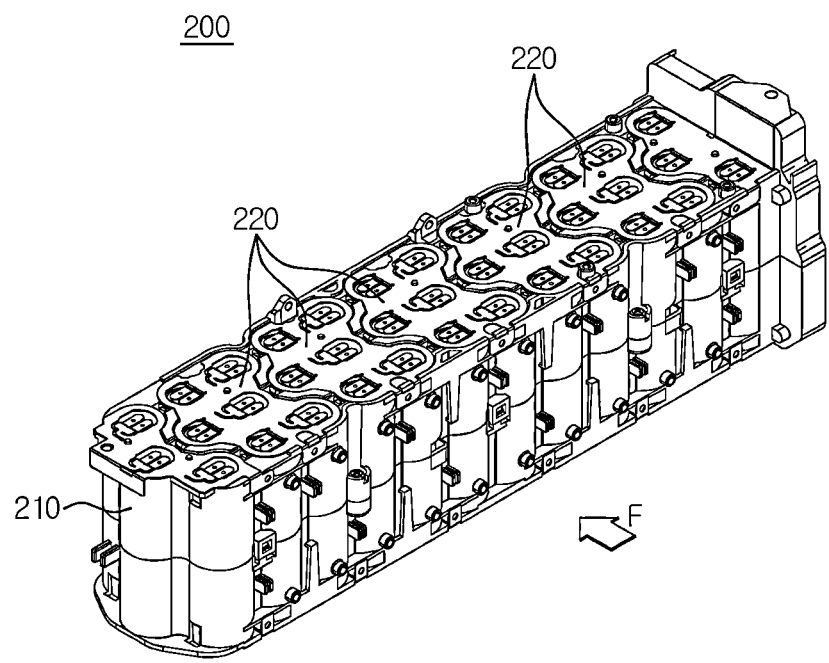
FIG. 1 is a perspective view schematically showing a battery module according to an embodiment of the present disclosure.
Figure 2:
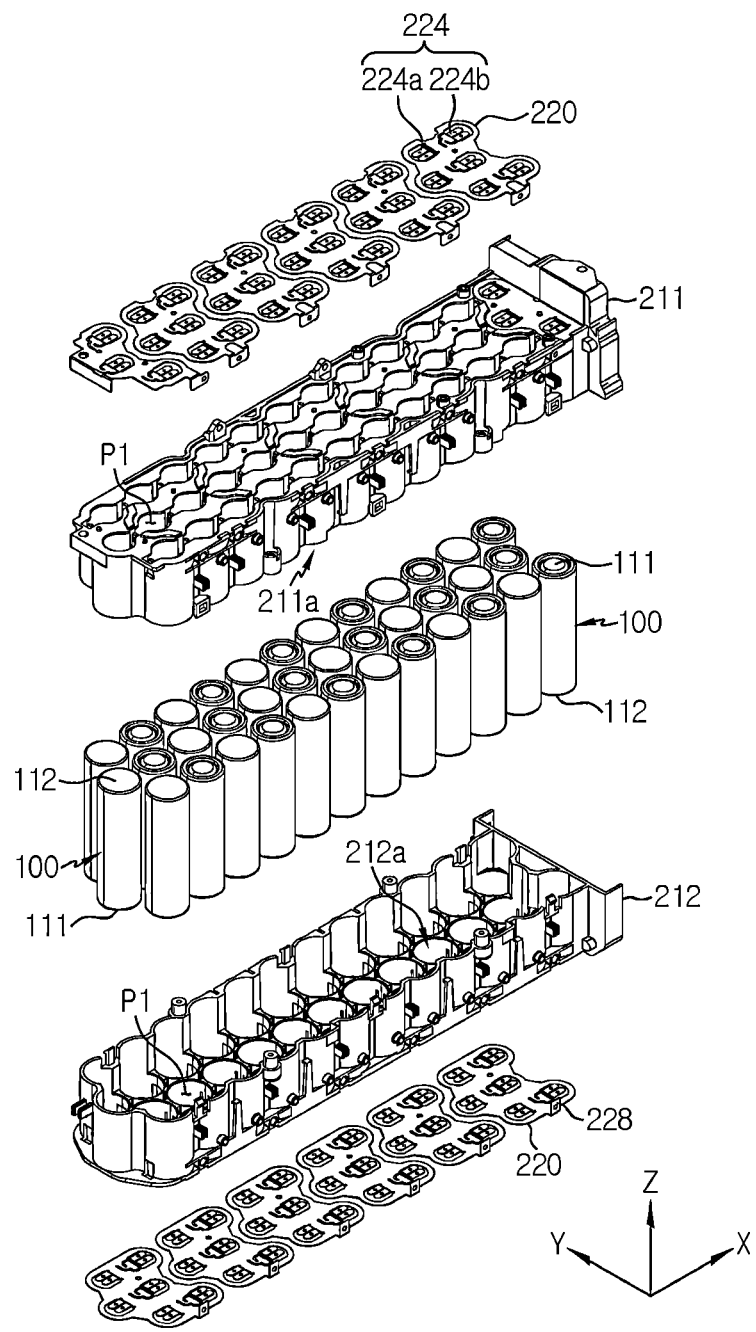
FIG. 2 is an exploded perspective view schematically showing a battery module according to an embodiment of the present disclosure.
Figure 3:
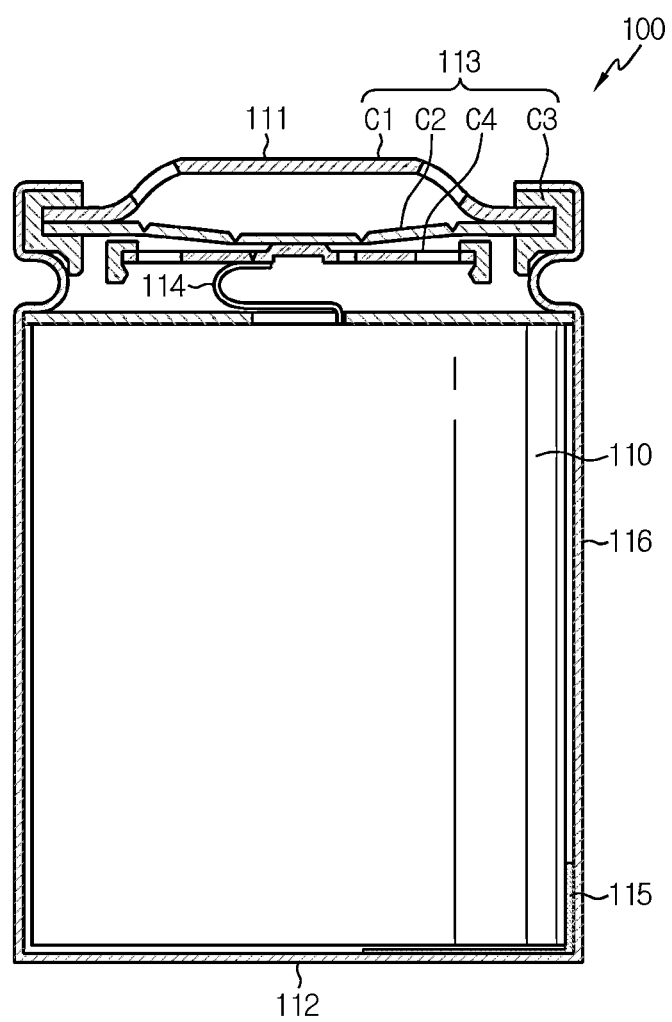
FIG. 3 is a cross-sectional view schematically showing a cylindrical battery cell that is a component of a battery module, according to an embodiment of the present disclosure.
Figure 4:
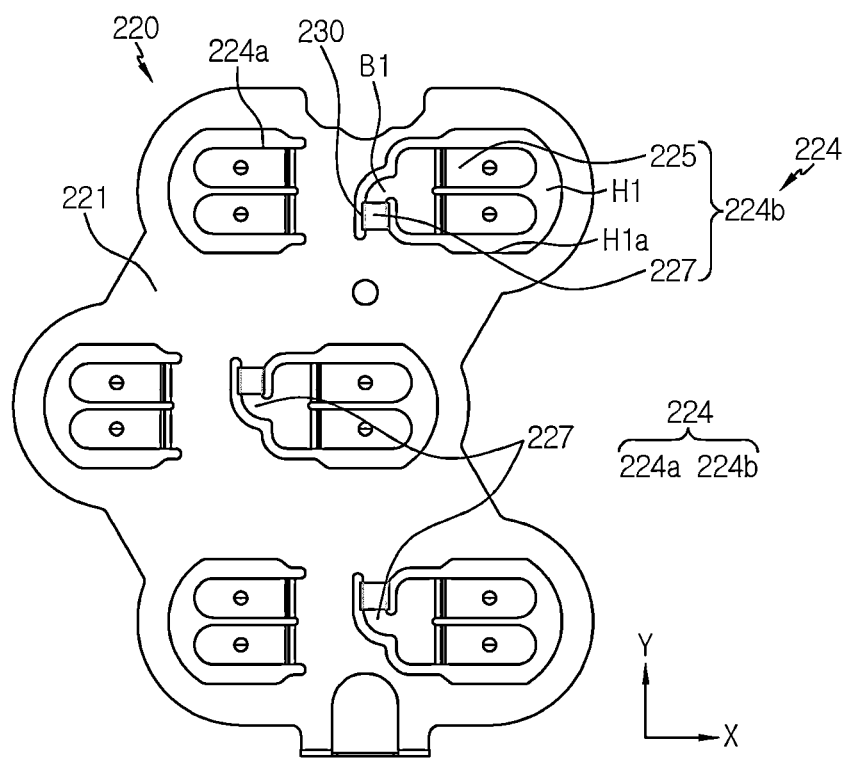
FIG. 4 is a plan view schematically showing a busbar plate that is a component of a battery module, according to an embodiment of the present disclosure.

FIG. 1 is a perspective view schematically showing a battery module according to an embodiment of the present disclosure. FIG. 2 is an exploded perspective view schematically showing a battery module according to an embodiment of the present disclosure. FIG. 3 is a cross-sectional view schematically showing a cylindrical battery cell that is a component of a battery module, according to an embodiment of the present disclosure. FIG. 4 is a plan view schematically showing a busbar plate that is a component of a battery module, according to an embodiment of the present disclosure.

Referring to FIGS. 1 through 4, a battery module 200 according to an embodiment of the present disclosure may include a plurality of cylindrical battery cells 100, a module housing 210, and a plurality of busbar plates 220.

Here, the cylindrical battery cell 100 may include a cylindrical battery can 116 and an electrode assembly (not shown) accommodated inside the battery can 116.

Also, the battery can 116 includes a material having high electric conductivity and for example, the battery can 116 may include an aluminum or copper material.

In addition, the battery can 116 may be configured in a shape elongated in an up-and-down direction. Also, the battery can 116 may have a cylindrical shape extending in the up-and-down direction. Moreover, an electrode terminal 111 may be formed respectively on an upper portion and a lower portion of the battery can 116. In detail, a positive electrode terminal 111 may be formed on a flat circular upper surface of an upper end of the battery can 116 and a negative electrode terminal 112 may be formed on a flat circular lower surface of a lower end of the battery can 116.

In addition, the plurality of cylindrical battery cells 100 may be arranged in columns and rows in a horizontal direction. Here, the horizontal direction may denote a direction parallel to the ground when the cylindrical battery cell 100 is placed on the ground, and may be at least one direction on a plane perpendicular to the up-and-down direction. Also, the horizontal direction may be X- and Y-axis directions of FIG. 2.

For example, as shown in FIG. 2, the battery module 200 includes the 36 cylindrical battery cells 100 arranged in three columns of a front-and-back direction (the Y-axis direction of FIG. 2) and twelve rows of a left-and-right direction (the X-axis direction). Here, among the plurality of cylindrical battery cells 100, eighteen of them include the positive electrode terminals 111 and the negative electrode terminals 112 respectively at upper portions and lower portions, and remaining eighteen of them include the negative electrode terminals 112 and the positive electrode terminals 111 respectively at upper portions and lower portions.

Also, the cylindrical battery cell 100 may include an electrode assembly 110, the battery can 116, and a cap assembly 113.

The electrode assembly 110 may have a wound structure while a separator is disposed between a positive electrode plate and a negative electrode plate. A positive electrode tab 114 may be attached to the positive electrode plate to be connected to the cap assembly 113 and a negative electrode tab 115 may be attached to the negative electrode plate to be connected to a lower end of the battery can 116.

The battery can 116 may have an empty space therein to accommodate the electrode assembly 110. In particular, the battery can 116 may have a cylindrical shape or an angular shape and be configured in a shape in which an upper end is opened. Also, the battery can 116 may be configured in a metal material such as steel or aluminum to secure rigidity or the like. Also, in the battery can 116, a negative electrode tab may be attached to a lower end such that not only a lower portion of the battery can 116, but also the battery can 116 itself may function as the negative electrode terminal 112.

The cap assembly 113 may be combined to an upper end open portion of the battery can 116 to seal an open end of the battery can 116. Such a cap assembly 113 may have a circular shape, an angular shape, or the like depending on a shape of the battery can 116, and may include sub-components such as a top cap C1, a gas vent portion C2, and a gasket C3.

Here, the top cap C1 may be located at an uppermost portion of the cap assembly and configured in a shape protruding in an upper direction. In particular, such a top cap C1 may function as the positive electrode terminal 111 in the cylindrical battery cell 100. Accordingly, the top cap C1 may be electrically connected to another cylindrical battery cell 100, a load, or a charging apparatus via an external apparatus, such as the busbar plate 220 or the like. The top cap C1 may be formed of a metal material, for example, stainless steel or aluminum.

The gas vent portion C2 may be configured such that a shape of the gas vent portion C2 is deformed when an internal pressure of the cylindrical battery cell 100, i.e., an internal pressure of the battery can 116, is increased to a predetermined pressure or higher due to generation of a gas therein. For example, an internal gas of the battery can 116 may be jetted through the gas vent portion C2 to open the top cap C1. In other words, the gas vent portion C2 may open the positive electrode terminal 111 or the negative electrode terminal 112.

Also, the gasket C3 may be formed of a material having electric insulation such that edge portions of the top cap C1 and gas vent portion C2 are insulated from the battery can 116.

Meanwhile, the cap assembly 113 may further include a current blocking member C4. The current blocking member C4 is also referred to as a current interrupt device (CID), and an electric connection between the gas vent portion C2 and the electrode assembly 110 may be blocked as a contact between the gas vent portion C2 and the current blocking member C4 is disconnected or the current blocking member C4 is damaged when an internal pressure of a battery is increased due to gas generation and a shape of the gas vent portion C2 is reversed.

Such a configuration of the cylindrical battery cell 100 is widely known to one of ordinary skill in the art at the time of filing of the present disclosure, and thus detailed descriptions thereof will be omitted in the present specification. Also, an example of the cylindrical battery cell 100 is shown in FIG. 3, but the battery module 200 according to the present disclosure is not limited to a specific configuration of the cylindrical battery cell 100. In other words, various secondary batteries known at the time of filing of the present disclosure may be employed in the battery module 200 according to the present disclosure.

Meanwhile, the module housing 210 may include an upper case 211 and a lower case 212.

In detail, referring back to FIG. 2, the upper case 211 and the lower case 212 may respectively include accommodating portions 211a and 212a capable of inserting and accommodating the cylindrical battery cell 100 therein. The accommodating portions 211a and 212a may each include a plurality of hollows P1 formed to surround an outer surface of the cylindrical battery cell 100.

The module housing 210 may include plastic of electric insulation. The plastic may be, for example, polyvinyl chloride, nylon, or polyethylene terephthalate.

Here, terms indicating directions such as front, back, left, right, up, and down may vary depending on a position of an observer or a how an object is placed. However, in the present specification, for convenience of description, the directions such as front, back, left, right, up, and down are distinguished based on view in an F direction.

Referring back to FIG. 4 together with FIG. 2 again, the busbar plate 220 may have one surface contacting the positive electrode terminals 111 and the negative electrode terminals 112 of at least two cylindrical battery cells 100 from among the plurality of cylindrical battery cells 100 to be electrically connected thereto. In other words, the busbar plate 220 may be configured to contact the positive electrode terminals 111 or negative electrode terminals 112 of the plurality of cylindrical battery cells 100 to electrically connect the plurality of cylindrical battery cells 100 to each other.

In detail, the busbar plate 220 may include a main body portion 221 and a connection terminal 224. Here, the connection terminal 224 may include a positive electrode connection terminal 224a configured to contact the positive electrode terminal 111 and a negative electrode connection terminal 224b configured to contact the negative electrode terminal 112.

Here, the main body portion 221 may have a plate shape flat in the horizontal direction to cover the plurality of cylindrical battery cells 100. In other words, the main body portion 221 may have the plate shape in which an upper surface and a lower surface are relatively wider than side surfaces in the horizontal direction (X-axis direction and Y-axis direction). Also, the main body portion 221 may be located at the upper portions or lower portions of the plurality of cylindrical battery cells 100 where the positive electrode terminals 111 or negative electrode terminals 112 are formed. Also, the main body portion 221 and the connection terminal 224 may include an electric conductive metal to electrically connect the plurality of cylindrical battery cells 100 to each other. The electric conductive metal may be an alloy of nickel, copper, aluminum, and the like.

An external terminal 228 electrically connected to the plurality of cylindrical battery cells 100 may be provided in at least a region of the main body portion 221 where a connection opening H1 is not formed. The external terminal 228 may be configured to be electrically connected to a battery management system (not shown). Alternatively, the battery module 200 may be electrically connected to another busbar plate 220.

At least one connection opening H1 perforated in an up-and-down direction may be formed in the main body portion 221. The connection opening H1 may be perforated in the up-and-down direction at a portion facing the positive electrode terminal 111 or the negative electrode terminal 112.

In addition, the positive electrode connection terminal 224a may be configured to electrically connect the plurality of cylindrical battery cell 100 by protruding and extending from an edge H1a of the connection opening H1, wherein the protruded and extended portion contacts the positive electrode terminal 111.

The negative electrode connection terminal 224b may be configured to electrically connect the plurality of cylindrical battery cell 100 by protruding and extending from the edge H1a of the connection opening H1, wherein the protruded and extended portion contacts the negative electrode terminal 112.

For example, as shown in FIG. 4, one busbar plate 220 of the present disclosure may include the main body portion 221 having a plate shape flat in the horizontal direction, three positive electrode connection terminals 224a, and three negative electrode connection terminals 224b.

Also, the positive electrode connection terminal 224a and the negative electrode connection terminal 224b may protrude and extend in the horizontal direction from the edge H1a of the connection opening H1. In other words, the positive electrode connection terminal 224a and the negative electrode connection terminal 224b may be formed to be located inside the connection opening H1.

In addition, the negative electrode connection terminal 224b contacting the positive electrode terminal 111 or negative electrode terminal 112, which is not opened by the gas vent portion C2, from among the positive electrode connection terminal 224a or the negative electrode connection terminal 224b, may include a fuse portion 227. The fuse portion 227 may be configured to be disconnected when a current of a predetermined level or higher flows from the cylindrical battery cell 100. In other words, when the current of the predetermined level or higher flows, a portion of the fuse portion 227 may be melted and lost by resistance heat. According to such a principle, the fuse portion 227 may be electrically disconnected. Here, the current of the predetermined level or higher may be 80 A or higher.

The fuse portion 227 may have a bent structure B1 bent at least one time in the horizontal direction. For example, as shown in FIG. 4, the fuse portion 227 may have the bent structure B1 in which the fuse portion 227 protrudes and extends in a front-and-back direction (Y-axis direction) from the edge H1a of the connection opening H1 and an extended end portion is bent again in a right direction (X-axis direction).

Thus, according to such a configuration of the present disclosure, the connection terminal 224 contacting the positive electrode terminal 111 or negative electrode terminal 112 not opened by the gas vent portion C2, from among the positive electrode connection terminal 224a or the negative electrode connection terminal 224b, includes the fuse portion 227 configured to be disconnected when the current of the predetermined level or higher flows from the cylindrical battery cell 100, and thus when a high current flows to the specific cylindrical battery cell 100 as a short circuit is generated between the plurality of cylindrical battery cells 100 inside the battery module 200, the specific cylindrical battery cell 100 and the busbar plate 220 may be electrically disconnected by the fuse portion 227. In other words, a fire or run-away phenomenon of the battery module 200 may be prevented via the fuse portion 227. Accordingly, stability of the battery module 200 may be increased.

Further, because the fuse portion 227 is provided at the connection terminal 224 contacting the positive electrode terminal 111 or negative electrode terminal 112 not opened by the gas vent portion C2, an electrode terminal (for example, a negative electrode terminal) not opened by the gas vent portion C2 is located closer to the electrode assembly than an electrode terminal opened by the gas vent portion C2. Accordingly, internal heat of the cylindrical battery cell 100 is further effectively received, and thus fuse disconnection may be achieved faster and easier by receiving the internal heat of the cylindrical battery cell 100 to the fuse portion 227.

Also, a fuse function of all cylindrical battery cells 100 may be exhibited even when only one of the positive electrode connection terminal 224a and the negative electrode connection terminal 224b includes a fuse portion without having to provide the fuse portion 227 to each of the connection terminals 224 included in the busbar plate 220. This is because the two busbar plates 220 are provided on each of the upper portion and the lower portion of the plurality of cylindrical battery cells 100. Accordingly, in the present disclosure, the number of configurations of the fuse portion 227 having relatively low mechanical rigidity by being configured in a narrow width may be reduced, thereby preventing durability of the busbar plate 220 from deteriorating.

Also, because the fuse portion 227 has the bent structure B1 bent at least one time in the horizontal direction, it is easy to secure a longer current path in a same space. In other words, when the fuse portion 227 has a shape extending in a straight line, a larger connection opening H1 needs to be formed, which may be a factor of a space restriction for one busbar plate 220 to form an electric connection with more cylindrical battery cells 100 in a predetermined space. Accordingly, in the present disclosure, it is easy to implement the compact battery module 200 by significantly reducing a space occupied by the fuse portion 227 of the busbar plate 220.

Meanwhile, the connection terminal 224 contacting the positive electrode terminal 111 or negative electrode terminal 112 not opened by the gas vent portion C2, from among the positive electrode connection terminal 224a or the negative electrode connection terminal 224b, may further include a protection tube 230.

In detail, the protection tube 230 may include a material of electric insulation. Also, the material of electric insulation may have a property of being contracted at a predetermined temperature. Also, the protection tube 230 may have a shape of surrounding at least a portion of an outer surface of the fuse portion 227. For example, the protection tube 230 may include a thermal contractive material of which volume is reduced at a specific temperature. For example, the thermal contractive material may be manufactured by using a polyester-based resin, a polyolefin-based resin, or a polyphenylene-based resin. In detail, the thermal contractive material may include at least one of polystyrene, polyethylene terephthalate (PET), polyolefin, nylon, polyvinyl chloride (PVC), and polybutylene terephthalate (PBT).

Thus, according to such a configuration of the present disclosure, by applying the protection tube 230 having electric insulation, contracting at a predetermined temperature, and configured to surround at least a portion of the outer surface of the fuse portion 227 to the connection terminal 224 including the fuse portion 227, heat may be prevented from being externally dissipated when the fuse portion 227 is melted by a high current. Accordingly, the fuse portion 227 may rise to a high temperature more quickly and achieve quick disconnection.

Further, by the protection tube 230 surrounding the outer surface of the fuse portion 227, the melted portion of the fuse portion 227 may be prevented from generating electric disconnection or damaging another internal component by moving to the other internal component (for example, the cylindrical battery cell 100).

Moreover, because the protection tube 230 includes the thermal contractive material, when the fuse portion 227 rises to the high temperature, thermal contraction of reducing the volume may occur, thereby pressing the outer surface of the fuse portion 227. Here, the pressed fuse portion 227 may break faster than a portion not surrounded by the protection tube 230.

Referring back to FIG. 4, the positive electrode connection terminal 224a and the negative electrode connection terminal 224b may include connecting portions 225 provided to directly contact or be welded respectively to the positive electrode terminal 111 and the negative electrode terminal 112 of the cylindrical battery cell 100.

The connecting portion 225 may have a branched structure branched in two sides in the horizontal direction. Such a branched structure may help resistance welding between the positive electrode terminal 111 or negative electrode terminal 112 and the connecting portion 225. Also, a welding point configured to contact a welding rod (not shown) is provided at each of two branched portions of the branched structure.

Also, the fuse portion 227 may protrude and extend in the horizontal direction from the inner edge H1a of the connection opening H1, and an end portion in an extended direction may have a structure connected to one end portion of the connecting portion 225.

However, the connection terminal 224 described above is only an example of the present disclosure, and is not necessarily limited to such a shape. Accordingly, various shapes of fuse portions may be applied to the present disclosure as described below.

Figure 5:
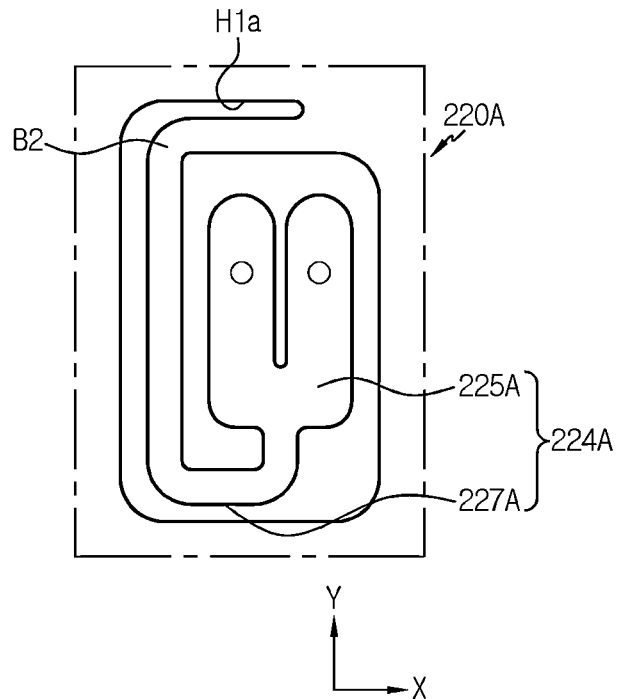
FIG. 5 is a partial plan view schematically showing a connection terminal of a busbar plate that is a component of a battery module, according to another embodiment of the present disclosure.

FIG. 5 is a partial plan view schematically showing a connection terminal of a busbar plate that is a component of a battery module, according to another embodiment of the present disclosure. For reference, the protection tube 230 is removed from FIG. 5 to describe a fuse portion 227A of the connection terminal.

Referring to FIG. 5, a busbar plate 220A according to another embodiment of the present disclosure may have a bent structure B2 in which the fuse portion 227A of the connection terminal 224A is bent three times in the horizontal direction. For example, as shown in FIG. 5, the fuse portion 227A may have the bent structure B2 in which the fuse portion 227A protrudes and extends in a left direction (a negative direction on X coordinates) from the edge H1a of the connection opening H1, the protruded and extended end portion is bent forward (a negative direction on Y coordinates) again, the bent end portion is bent to a right side again, and the bent end portion is bent backward (a positive direction on the Y coordinates) again. In other words, the fuse portion 227A may have a shape that is rotated and bent by 270°.

Thus, because the connection terminal 224A of the busbar plate 220A according to another embodiment of the present disclosure has the bent structure B2 bent three times, it is easy to design a length of the fuse portion 227A longer compared to the connection terminal 224 of the busbar plate 220 of FIG. 4 having the bent structure B1 of FIG. 4 of one time. In other words, as the length of the fuse portion 227A increases, electric resistance of the fuse portion 227A is increased, and thus even when a width of the fuse portion 227A is set to be wide, the fuse portion 227A is easily melted and cut according to high resistance due to the long length.

Figure 6:
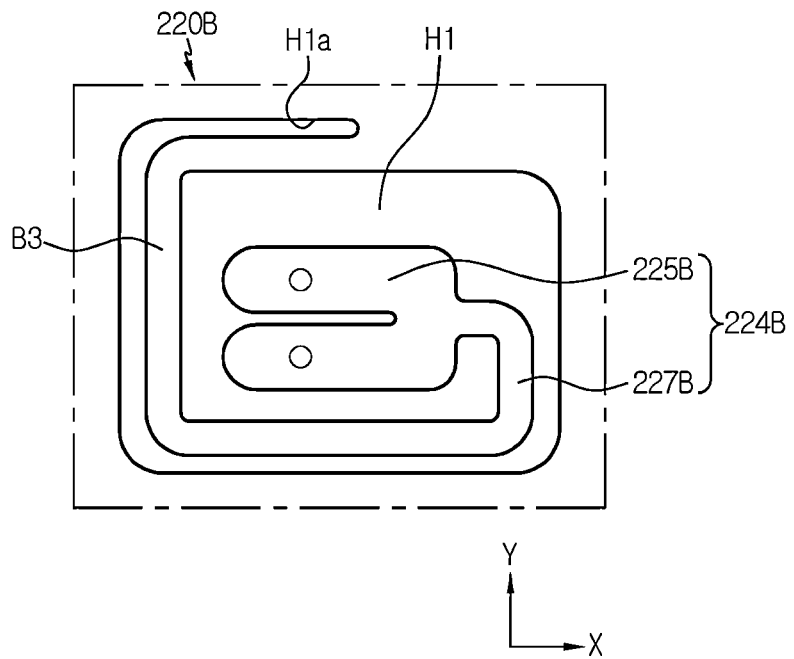
FIG. 6 is a partial plan view schematically showing a connection terminal of a busbar plate that is a component of a battery module, according to another embodiment of the present disclosure.

FIG. 6 is a partial plan view schematically showing a connection terminal of a busbar plate that is a component of a battery module, according to another embodiment of the present disclosure. For reference, the protection tube 230 is removed from FIG. 6 to describe a fuse portion 227B of the connection terminal.

Referring to FIG. 6, a busbar plate 220B according to another embodiment of the present disclosure may have a bent structure B3 in which the fuse portion 227B of the connection terminal 224B is bent four times in the horizontal direction. For example, as shown in FIG. 6, the fuse portion 227B may have the bent structure B3 in which the fuse portion 227B protrudes and extends in the left direction (the negative direction on the X coordinates) from the edge H1a of the connection opening H1, the extended end portion is bent forward (the negative direction on the Y coordinates) again, the bent end portion is bent to the right side (the X-axis direction) again, the bent end portion is bent forward (the Y-axis direction) again, and the bent end portion is bent to the left side (the negative direction of the X-coordinates) again. In other words, the fuse portion 227B may have a shape that is rotated and bent by 360°.

Thus, because the connection terminal 224B of the busbar plate 220B according to another embodiment of the present disclosure has the bent structure B3 bent four times, it is easy to design a length of the fuse portion 227B longer compared to the connection terminal 224A of the busbar plate 220A of FIG. 5 having the bent structure of three times. In other words, as the length of the fuse portion 227B increases, electric resistance of the fuse portion 227B is increased, and thus even when a width of the fuse portion 227B is set to be wide, the fuse portion 227B is easily melted and cut according to high resistance due to the long length.

Figure 7:
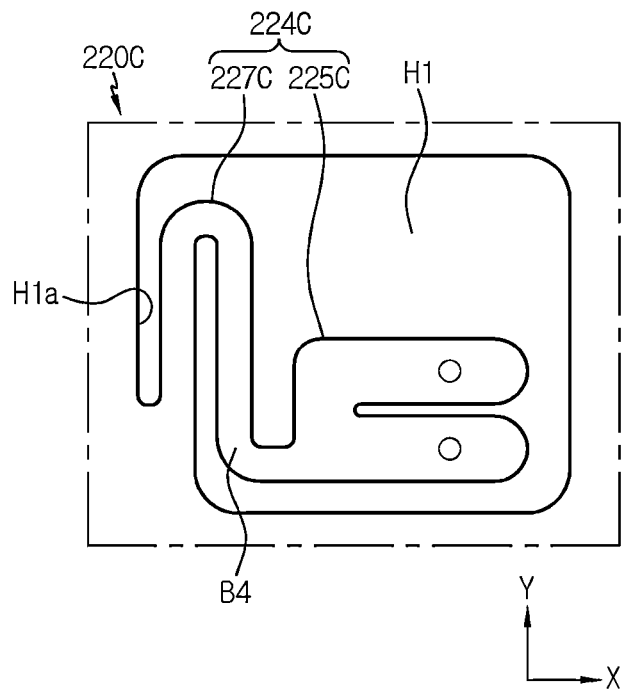
FIG. 7 is a partial plan view schematically showing a connection terminal of a busbar plate that is a component of a battery module, according to another embodiment of the present disclosure.

FIG. 7 is a partial plan view schematically showing a connection terminal of a busbar plate that is a component of a battery module, according to another embodiment of the present disclosure.

Referring to FIG. 7, a busbar plate 220C according to another embodiment of the present disclosure may have a bent structure B4 in which a fuse portion 227C of a connection terminal 224C is bent at least three times in the horizontal direction. Here, the bent structure B4 bent at least three times may have a shape bent at least two times in opposite directions.

For example, as shown in FIG. 7, the busbar plate 220C according to another embodiment may have the bent structure B4 in which the fuse portion 227C protrudes and extends backward (the positive direction on the Y coordinates) from the edge H1a of the connection opening H1, the extended end portion is bent forward (the negative direction on the Y coordinates) again, and the bent end portion is bent to the right side (the X-axis direction) again. In other words, the fuse portion 227C may have the bent structure B4 alternately bent forward and backward at least one time.

Thus, according to such a configuration of the present disclosure, the bent structure B4 of the connection terminal 224C has a shape bent at least two times in opposite directions, and thus the fuse portion 227C may have a shape in which a bent portion bent in one direction and a bent portion bent in another direction are adjacent to each other. In such a structure, when a high current flows in the fuse portion 227C, heat is exchanged between the adjacent bent portions, and thus the fuse portion 227C may quickly rise to a high temperature. Accordingly, the fuse portion 227C of the present disclosure may further quickly disconnected.

Figure 8:
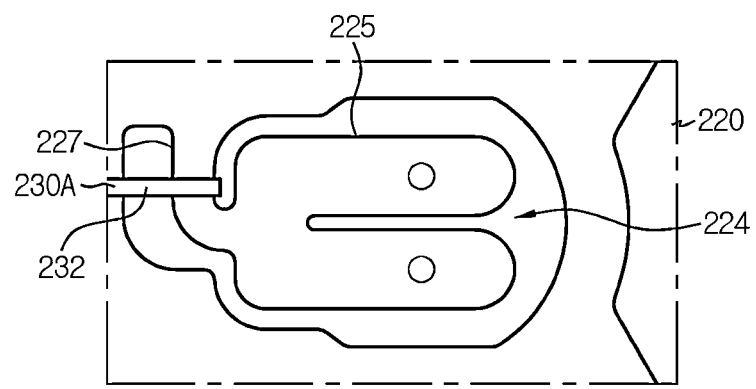
FIG. 8 is a partial plan view schematically showing a portion of a busbar plate that is a component of a battery module, according to another embodiment of the present disclosure.

FIG. 8 is a partial plan view schematically showing a portion of a busbar plate that is a component of a battery module, according to another embodiment of the present disclosure.

Referring to FIG. 8 together with FIG. 2, a protection tube 230A of the battery module according to another embodiment may be configured to fix the fuse portion 227. For example, as shown in FIG. 8, the protection tube 230A may have a structure in which one side is connected to the inner edge H1a of the connection opening H1 and another side is connected to the fuse portion 227. In detail, the one side of the protection tube 230A may be attached to the edge H1a while surrounding the edge H1a. The other side of the protection tube 230A has a tube shape and may be configured to surround a circumference of a portion of the fuse portion 227. The protection tube 230A may include an extending portion 232 extending from one side of the tube shape surrounding the fuse portion 227 to connect to the inner edge H1a of the connection opening H1.

Also, an extended end portion of the extending portion 232 may be configured to surround a portion of the inner edge H1a of the connection opening H1. In other words, the extended end portion of the extending portion 232 may be configured to adhere to an upper surface and lower surface of the portion of the inner edge H1a of the connection opening H1. In other words, the extended end portion of the extending portion 232 may have a sandwich structure with the edge H1a. Here, the extending portion 232 may be in a hard solidified state.

Thus, according to such a configuration of the present disclosure, the protection tube 230A has a structure in which the one side is connected to the inner edge H1a of the connection opening H1 and the other side is connected to the fuse portion 227, and thus when the battery module 200 continuously vibrates due to an external force, vibration of the fuse portion 227 may be reduced by the extending portion 232 of the protection tube 230A. Accordingly, a risk that the fuse portion 227 may be cut or damaged by continuous vibration may be effectively reduced.

Referring to FIG. 8 together with FIG. 2 again, the protection tube 230A may be configured to at least partially thermally contract to pull a portion of the fuse portion 227 when the fuse portion 227 is disconnected. The protection tube 230A may include the extending portion 232 extending from one side of the tube shape surrounding the fuse portion 227 to connect to the inner edge H1a of the connection opening H1.

The extending portion 232 may include a material having a thermal contractive property in which volume is reduced at a predetermined temperature or higher. For example, the material having the thermal contractive property may be manufactured by using a polyester-based resin, a polyolefin-based resin, or a polyphenylene sulfide-based resin. In particular, the material having the thermal contractive property may include at least one of polystyrene, polyethylene terephthalate (PET), polyolefin, nylon, polyvinyl chloride (PVC), and polybutylene terephthalate (PBT).

Figure 9:
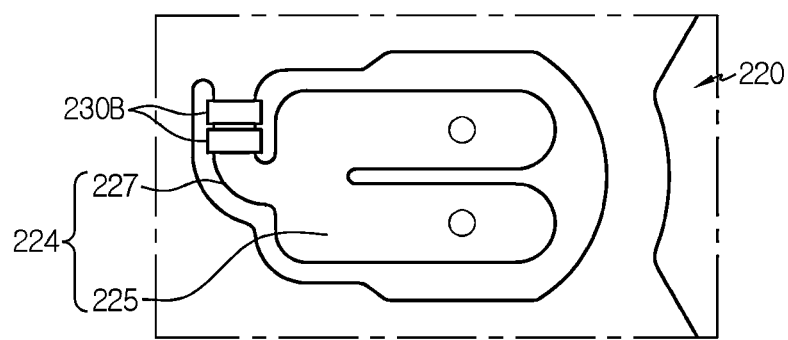
FIG. 9 is a partial plan view schematically showing a portion of a busbar plate that is a component of a battery module, according to another embodiment of the present disclosure.

FIG. 9 is a partial plan view schematically showing a portion of a busbar plate that is a component of a battery module, according to another embodiment of the present disclosure.

Referring to FIG. 9 together with FIG. 2, a protection tube 230B of the battery module according to another embodiment of FIG. 9 may have a shape separated in at least two pieces. For example, as shown in FIG. 9, the protection tube 230B may be located on the fuse portion 227 while being separated into two pieces. The protection tube 230B separated in at least two pieces may be spaced apart from each other at a predetermined interval. Here, the spaced interval may be configured to discharge a melted portion when a portion of the fuse portion 227 is melted.

Thus, according to such a configuration of the present disclosure, the protection tube 230B has a shape separated in at least two pieces, and thus when the fuse portion 227 is disconnected by a high current, the melted portion of the fuse portion 227 may be guided to escape between the at least two separated shapes of the protection tube 230B. In addition, the protection tube 230B separated in at least two pieces does not prevent the fuse portion 227 from being separated into two pieces, and thus the fuse portion 227 may be effectively disconnected.

Figure 10:
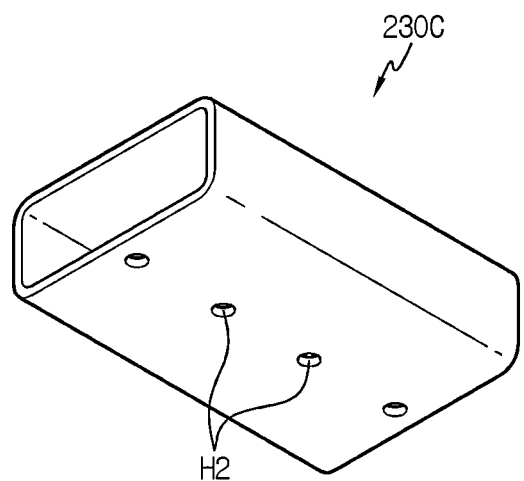
FIG. 10 is a bottom perspective view schematically showing a protection tube that is a component of a battery module, according to another embodiment of the present disclosure.

FIG. 10 is a bottom perspective view schematically showing a protection tube that is a component of a battery module, according to another embodiment of the present disclosure.

Referring to FIG. 10 together with FIG. 2, a protection tube 230C of the battery module according to another embodiment of FIG. 10 may further include a discharge hole H2 configured to externally discharge the melted portion of the fuse portion 227. For example, as shown in FIG. 10, the protection tube 230C may include four discharge holes H2 at a lower portion such that the melted portion of the fuse portion 227 is externally discharged. Here, the four discharge holes H2 may be spaced apart from each other at predetermined intervals. Also, the discharge hole H2 may have a perforated shape such that an outer portion and an inner portion communicate with each other.

Thus, according to such a configuration of the present disclosure, the protection tube 230C includes the discharge hole H2 configured to externally discharge the melted portion of the fuse portion 227, and thus when the fuse portion 227 is disconnected by a high current, the melted portion of the fuse portion 227 may be guided to be discharged through the discharge hole H2 of the protection tube 230C. Accordingly, the melted portion of the fuse portion 227 is effective removed, thereby effectively achieving disconnection of the fuse portion 227.

Figure 11:
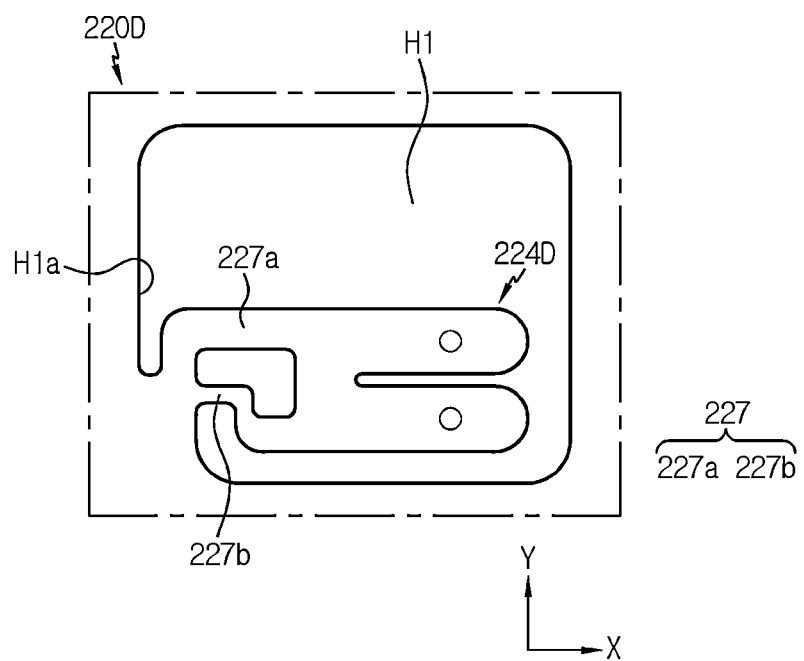
FIG. 11 is a partial plan view schematically showing a connection terminal of a busbar plate that is a component of a battery module, according to another embodiment of the present disclosure.

FIG. 11 is a partial plan view schematically showing a connection terminal of a busbar plate that is a component of a battery module, according to another embodiment of the present disclosure.

Referring to FIG. 11, a connection terminal 224D of a busbar plate 220D of FIG. 11 may include two or more fuse portions 227a and 227b, unlike the connection terminal 224 of FIG. 4. Here, the two or more fuse portions 227a and 227b may be spaced apart from each other at a predetermined interval. Here, the two or more fuse portions 227a and 227b may have different sizes in widths in the horizontal direction.

For example, one of the two or more fuse portions 227a and 227b having a relatively larger width is defined as a first fuse portion 227a, and the first fuse portion 227a may be configured to be disconnected by being melted at a predetermined current required to protect the battery module of the present disclosure. The remaining fuse portion 227 having a relatively small width is defined as a second fuse portion 227b, and in the second fuse portion 227b, a size of a current for melting may be smaller than the first fuse portion 227a. Also, the first fuse portion 227a may have smaller electric resistance than the second fuse portion 227b. Here, a protection tube (not shown) may be included only in the first fuse portion 227a from among the two or more fuse portions 227a and 227b.

In other words, during a normal operation of the battery module, a current of a predetermined level or higher may flow through the first fuse portion 227a having relatively small electric resistance. Then, when an abnormal behavior of the cylindrical battery cell 100 occurs in the connection terminal 224D and a high current of a predetermined level or higher flows in the first fuse portion 227a, the first fuse portion 227a is melted and broken, and the remaining second fuse portion 227b is also broken by the high current. Accordingly, a fuse portion of the present disclosure may block a current with higher reliability.

Thus, according to such a configuration of the present disclosure, the connection terminal 224D includes two or more fuse portions 227 having different sizes and spaced apart from each other at the predetermined interval, and thus durability of the connection terminal 224D may be increased compared to the busbar plate 220 of FIG. 4 including only one fuse portion 227.

In other words, in the related art, when the battery module 200 continuously vibrates by an external force, there is a risk that the fuse portion 227 may brake or be damaged by the continuous vibration. Accordingly, by providing the two or more fuse portions 227 to the connection terminal 224D, an entire width size of the plurality of fuse portions 227 may be further increased compared to one fuse portion 227, and thus the durability of the fuse portion 227 of the connection terminal 224D with respect to an external impact may be effectively increased.

Figure 12:
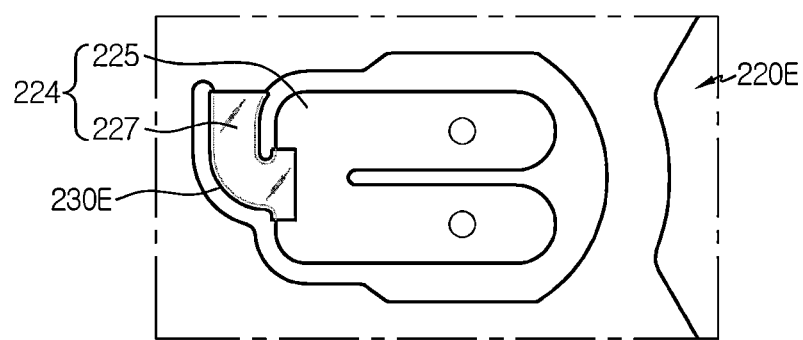
FIG. 12 is a partial plan view schematically showing a busbar plate that is a component of a battery module, according to another embodiment of the present disclosure.

FIG. 12 is a partial plan view schematically showing a busbar plate that is a component of a battery module, according to another embodiment of the present disclosure.

Referring to FIG. 12, a protection tube 230E of a busbar plate 220E of FIG. 12 may be formed by coating a melted material (in a resin state) throughout an outer surface of the fuse portion 227 and then hardening the melted material. Low-temperature hardening, ultraviolet hardening, or the like may be used as a hardening method. The protection tube 230E coated as such may be adhesively formed on the outer surface of the fuse portion 227 without a gap.

Thus, according to such a configuration of the present disclosure, the busbar plate 220E further includes the protection tube 230E that is hardened after being coated on the outer surface of the fuse portion 227 in a melted state, and thus mechanical rigidity of the fuse portion 227 may be reinforced by the protection tube 230E. Accordingly, when the battery module 200 of the present disclosure continuously vibrates by an external force, a risk that the fuse portion 227 may break or be damaged by the continuous vibration may be effectively reduced.

Figure 13:
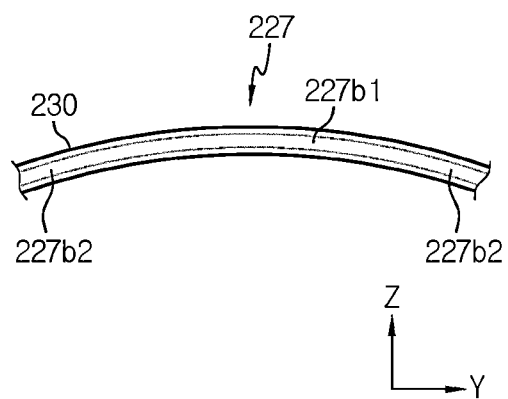
FIG. 13 is a partial side view schematically showing a portion of a busbar plate that is a component of a battery module, according to another embodiment of the present disclosure.

FIG. 13 is a partial side view schematically showing a portion of a busbar plate that is a component of a battery module, according to another embodiment of the present disclosure. In FIG. 13, for convenience of description, only a portion of the fuse portion 227 of the connection terminal 224 is shown.

Referring to FIG. 13 together with FIG. 4, the fuse portion 227 of the busbar plate of the battery module according to another embodiment of FIG. 13 of the present disclosure may have a shape in which at least a portion to which the protection tube 230 is applied is curved in an arch shape. Here, the arch shape denotes a shape in which, among a portion of the fuse portion 227, a center portion 227$b$1 is located relatively high as an upper portion and remaining both end portions 227$b$2 are located relatively low as lower portions. In other words, according to the arch shape, when one portion (in particular, the center portion) of the fuse portion 227 is disconnected, two portions separated by elasticity of the fuse portion 227 may be parted away from each other.

Thus, according to such a configuration of the present disclosure, the fuse portion 227 has a shape in which at least the portion to which the protection tube 230 is applied is curved in the arch shape, and thus disconnected portions of the fuse portion 227 may be effectively separated by elasticity of the arch shape, thereby effectively increasing reliability of electric disconnection.

Figure 14:
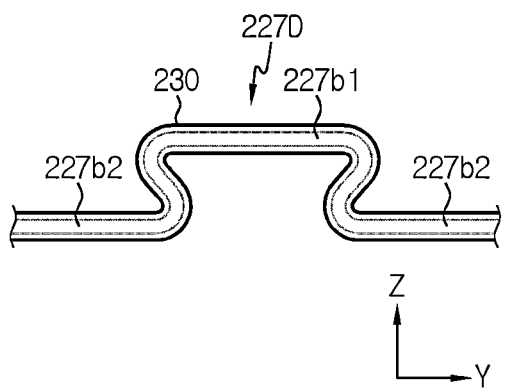
FIG. 14 is a partial side view schematically showing a portion of a busbar plate that is a component of a battery module, according to another embodiment of the present disclosure.

FIG. 14 is a partial side view schematically showing a portion of a busbar plate that is a component of a battery module, according to another embodiment of the present disclosure. In FIG. 14, for convenience of description, only a portion of a fuse portion 227D of the connection terminal 224 is shown.

Referring to FIG. 14 together with FIG. 4, the fuse portion 227D of the busbar plate of the battery module according to another embodiment of FIG. 14 of the present disclosure may have at least one portion, to which the protection tube 230 is applied, in a shape protruding and extending in an upper direction. The protruded shape may be formed by bending a plurality of times.

In detail, the protruded and extended shape of the fuse portion 227D may have the portions in which one end of the portion 227$b$2 of the fuse portion 227D is bent in the upper direction, one end of the portion 227$b$2 bent in the upper direction is bent again in the horizontal direction, one end of the portion 227$b$1 bent in the horizontal direction is bent again in a lower direction, and one end of the portion 227$b$1 bent in the lower direction is bent again in the horizontal direction.

In other words, among the portion of the fuse portion 227D, the center portion 227$b$1 may be located relatively high as an upper portion, and the remaining both end portions 227$b$2 may be located relatively low as lower portions. The center portion 227$b$1 may be connected to portions bent and extended from the both end portions 227$b$2.

Accordingly, when a portion (in particular, a center portion) of the fuse portion 227D is disconnected by a high current, separated two portions may be parted away from each other in a direction of the two end portions by elasticity of the bent portion of the fuse portion 227D.

Thus, according to such a configuration of the present disclosure, the portion of the fuse portion 227D of the present disclosure, to which the protection tube 230 is applied, has a shape protruding in the upper direction, and thus the two disconnected portions of the fuse portion 227 may be effectively separated by the elasticity of the bent portions, thereby effectively increasing reliability of electric disconnection.

Figure 15:
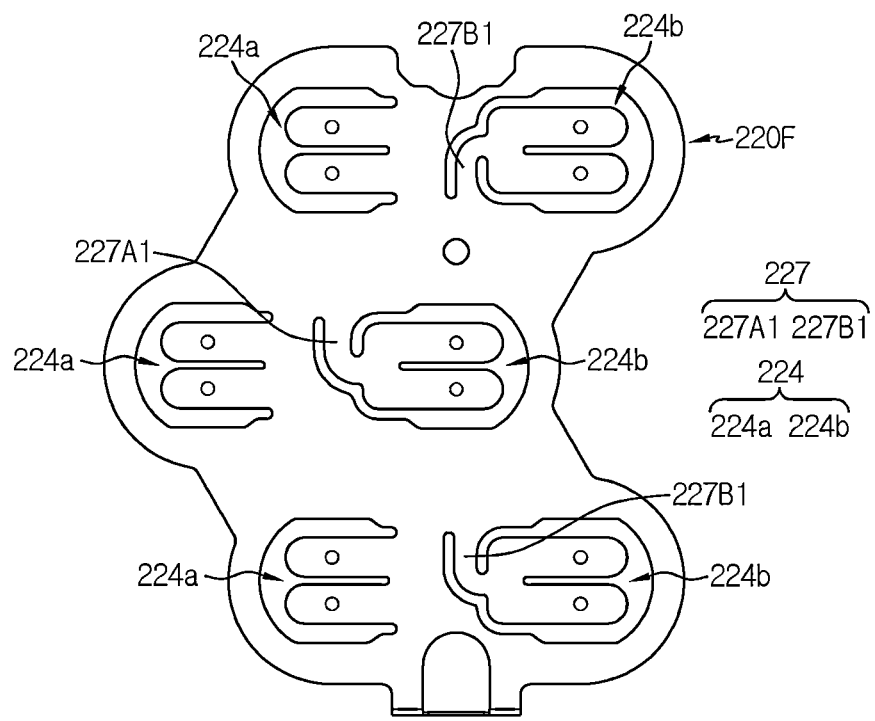
FIG. 15 is a plan view schematically showing a busbar plate that is a component of a battery module, according to another embodiment of the present disclosure.

FIG. 15 is a plan view schematically showing a busbar plate that is a component of a battery module, according to another embodiment of the present disclosure.

Referring to FIG. 15 together with FIG. 2, in a busbar plate 220F of the battery module according to another embodiment of FIG. 15, among the plurality of cylindrical battery cells 100 arranged in the plurality of rows and columns, a fuse portion 227A1 of the connection terminal 224 contacting the positive electrode terminal 111 or negative electrode terminal 112 of the cylindrical battery cell 100 located relatively inside in the horizontal direction may have a larger width than a fuse portion 227B1 of the connection terminal 224 contacting the positive electrode terminal 111 or negative electrode terminal 112 of the cylindrical battery cell 100 located outside in the horizontal direction.

In other words, the fuse portion 227A1 of the connection terminal 224 located relatively inside in the horizontal direction may have a larger vertical cross-sectional area than the fuse portion 227B1 of the connection terminal 224 located outside in the horizontal direction.

In other words, the fuse portion 227 of the connection terminal 224 of the present disclosure may set the cross-sectional area of the fuse portion 227 in consideration of thermal balance of the plurality of cylindrical battery cells 100 configured to be inserted and accommodated in the module housing 210 by being arranged in the plurality of rows and columns in the horizontal direction.

This is because the cylindrical battery cell 100 located inside in the horizontal direction may have a higher temperature than the cylindrical battery cell 100 located outside from among the plurality of cylindrical battery cells 100, during charging and discharging of the battery module 200. Accordingly, the fuse portion 227A1 of the connection terminal 224 contacting the positive electrode terminal 111 or negative electrode terminal 112 of the cylindrical battery cell 100 located inside in the horizontal direction may have relatively small electric resistance.

For example, as shown in FIG. 15, six connection terminals 224 may be provided to one busbar plate 220F. Among the six connection terminals 224, the fuse portion 227 may be provided to each of three negative electrode connection terminals 224$b$ contacting the negative electrode terminal 112. Here, among three negative electrode connection terminals 224$b$, a width of the fuse portion 227A1 of the negative electrode connection terminal 224$b$ located inside in the horizontal direction may be greater than widths of the fuse portions 227B1 of the negative electrode connection terminals 224$b$ located outside in a front-and-back direction.

In other words, the fuse portion 227A1 of the negative electrode connection terminal 224$b$ located relatively inside in the horizontal direction may have a greater width than the fuse portion 227B1 of the negative electrode connection terminal 224$b$ located outside in the horizontal direction.

Thus, according to such a configuration of the present disclosure, among the plurality of cylindrical battery cells 100 arranged in the plurality of rows and columns, the fuse portion 227A 1 of the connection terminal 224 contacting the positive electrode terminal 111 or negative electrode terminal 112 of the cylindrical battery cell 100 located relatively inside in the horizontal direction is configured to have a greater width than the fuse portion 227B1 of the connection terminal 224 contacting the positive electrode terminal 111 or negative electrode terminal 112 of the cylindrical battery cell 100 located outside in the horizontal direction, and thus the fuse portion 227 may be prevented from being disconnected below a current value set to be melted and cut by high heat of a center portion of the battery module 200. Accordingly, a malfunction in which disconnection occurs even when the cylindrical battery cell 100 is not abnormally operating while during the battery module 200 may be prevented.

Meanwhile, a battery pack (not shown) according to an embodiment of the present disclosure may include at least one battery module 200. Also, the battery pack may further include various apparatuses (not shown) for controlling charging and discharging of the battery module 200, such as a battery management system (BMS), a current sensor, a fuse, and the like.

An electronic device (not shown) according to an embodiment of the present disclosure includes at least one battery module 200 described above. The electronic device may further include a device housing (not shown) including an accommodating space for accommodating the battery module 200, and a display unit enabling a user to identify a charging state of the battery module 200.

In addition, the battery pack according to an embodiment of the present disclosure may be included in a vehicle, such as an electric vehicle or a hybrid vehicle. In other words, the vehicle according to an embodiment of the present disclosure may include, inside a body of the vehicle, the battery pack including at least one battery module 200 according to an embodiment of the present disclosure described above.

Meanwhile, terms used to indicate directions such as up, down, left, and right are used in the present specification, but these terms are merely for convenience of description and it would be obvious to one of ordinary skill in the art that the terms may vary depending on a location of a target object or a location of an observer.

As described above, although the present disclosure has been described with reference to limited embodiments and drawings, the present disclosure is not limited thereto and various modifications and variations may be implemented by one of ordinary skill in the art within the technical ideas of the present disclosure and the equivalent scope of the claims described below.

| [List of of Reference Numerals] | |
| --- | --- |
| 200: Battery Module | 220: Busbar Plate |
| 221: Main Body Portion | |
| 224, 224a, 224b: Connection Terminal, Positive Electrode Connection Terminal, Negative Electrode Connection Terminal | |
| 100: Cylindrical Battery Cell | C2: Gas Vent Portion |
| 111, 112: Positive Electrode Terminal, Negative Electrode Terminal | |
| B1: Bent Structure | |
| 210: Module Housing | H1: Connection Opening |
| 225: Connecting Portion | 227: Fuse Portion |
| 230: Protection Tube | H2: Discharge Hole |

INDUSTRIAL APPLICABILITY

The present disclosure relates to a battery pack. Also, the present disclosure is applicable to an electronic device including the battery pack and a vehicle industry including the battery pack.

What is claimed is:

1. A battery module comprising:
a plurality of cylindrical battery cells arranged in a horizontal direction, wherein first ones of the plurality of cylindrical battery cells include positive electrode terminals and negative electrode terminals respectively at upper portions and lower portions and second ones of the plurality of cylindrical battery cells include negative electrode terminals and positive electrode terminals respectively at upper portions and lower portions, and wherein each of the cylindrical battery cells includes a gas vent portion configured to discharge an internal gas by opening the positive electrode terminals or the negative electrode terminals when an internal pressure is increased to a predetermined pressure or higher; and
a busbar plate at the upper portions or lower portions of the plurality of cylindrical battery cells,
wherein the busbar plate includes a plate shape extending in the horizontal direction to cover the plurality of cylindrical battery cells,
wherein the busbar plate includes at least one connection opening facing the positive electrode terminals or negative electrode terminals in an up-and-down direction, and a positive electrode connection terminal and a negative electrode connection terminal that protrude and extend from an inner edge of the at least one connection opening to electrically connect the plurality of cylindrical battery cells to each other when the protruded and extended portion contacts the positive electrode terminals or the negative electrode terminals, the positive electrode connection terminal and the negative electrode connection terminal having different shapes depending on the contacted positive electrode terminals or negative electrode terminals,
wherein a connection terminal that contacts a positive electrode terminal or negative electrode terminal not having the gas vent portion, from among the positive electrode connection terminal and the negative electrode connection terminal, comprises:
a fuse portion configured to be disconnected when a current of predetermined level or higher flows from the plurality of cylindrical battery cells and having a bent structure bent at least one time in the horizontal direction; and
a protection tube, of an electrically insulating material, configured to contract at a predetermined temperature and configured to surround at least a portion of an outer surface of the fuse portion, and
wherein the protection tube comprises a discharge hole configured such that a melted portion of the fuse portion is externally discharged.

2. The battery module of claim 1, wherein the connection terminal further comprises a connecting portion directly contacting the positive electrode terminals or negative electrode terminals of the plurality of cylindrical battery cells and having a branched structure branched and extending in two sides, and
wherein the fuse portion protrudes and extends in the horizontal direction from an inner edge of the connection opening and an end portion in an extending direction is connected to one end portion of the connecting portion.

3. The battery module of claim 2, wherein the protection tube has one side connected to the inner edge of the connection opening and another side connected to the fuse portion.

4. The battery module of claim 3, wherein the protection tube is configured to at least partially thermally contract to pull a portion of the fuse portion when the fuse portion is disconnected.

5. The battery module of claim 3, wherein the protection tube has a shape separated in at least two pieces.

6. The battery module of claim 1, wherein the fuse portion of the connection terminal comprises at least two fuse portions and the at least two fuse portions are spaced apart from each other.

7. The battery module of claim 6, wherein the at least two fuse portions have different widths in the horizontal direction.

8. The battery module of claim 1, wherein the fuse portion has a shape in which a portion is curved in an arch shape, and
wherein, when the portion of the fuse portion in the arch shape is disconnected, two portions separated by the disconnection are parted from each other by elasticity.

9. The battery module of claim 1, wherein a fuse portion of a connection terminal contacting a positive electrode terminal or negative electrode terminal of a cylindrical battery cell located relatively inside from among the plurality of cylindrical battery cells arranged in the horizontal direction has a greater width than a fuse portion of a connection terminal contacting a positive electrode terminal or negative electrode terminal of a cylindrical battery cell located relatively outside.

10. A battery pack comprising at least one battery module of claim 1.

11. An electronic device comprising the battery pack of claim 10.

* * * * *